Figure 1:
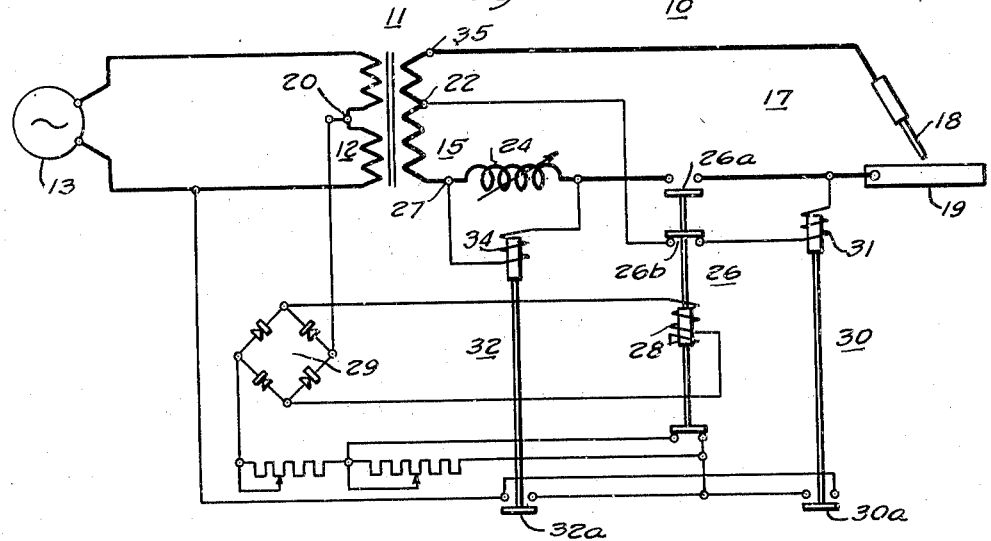

Dec. 20, 1949  E. I. EIGENBERGER  2,491,961
CONTROL SYSTEM
Filed Dec. 21, 1944

WITNESSES:
E. A. McCloskey.
G. V. Giolma

INVENTOR
Elroy I. Eigenberger.
BY
G. M. Crawford
ATTORNEY

Patented Dec. 20, 1949

2,491,961

UNITED STATES PATENT OFFICE 2,491,961

CONTROL SYSTEM

Elroy I. Eigenberger, Forest Hills, Pa., assignor to Westinghouse Electric Corporation, East Pittsburgh, Pa., a corporation of Pennsylvania Application December 21, 1944, Serial No. 569,213

7 Claims. (Cl. 315—276)

My invention relates, generally, to control systems, and it has reference in particular to reduced open circuit voltage safety control systems for alternating-current arc-welding systems.

Generally stated, it is an object of my invention to provide a safety control system for alternating-current arc-welding apparatus which is simple and inexpensive to manufacture and is reliable and effective in operation.

More specifically, it is an object of my invention to provide for normally interrupting the arc-welding circuit, and connecting a reduced control voltage thereto by utilizing switch means in the welding circuit having time delay characteristics.

Another object of my invention is to provide for using a rectifier bridge circuit for energizing a switch in the welding circuit of an alternating-current arc welder so as to provide the switch with time delay characteristics.

Yet another object of my invention is to provide a reduced open circuit voltage safety control unit for alternating-current arc welding transformers which may be used with arc-welding transformers of many different characteristics.

Still another object of my invention is to provide a unitary reduced open circuit voltage safety control which may be used with different types of alternating current arc-welders without requiring any connections to the welder other than those which may be made externally thereof to the input and output terminals.

It is also an important object of my invention to provide for normally applying a reduced voltage to an arc welding circuit, and for operating a switch in the welding circuit in response to contact of a welding electrode with the work on which a welding operation is to be performed, so as to apply the normal welding voltage to the welding circuit, and to provide for maintaining the switch in the operated position in response to the flow of welding current of a predetermined value in the welding circuit, and for a predetermined time after the current ceases to flow.

Other objects will in part be obvious, and will in part be explained hereinafter.

According to my invention, the welding circuit of an alternating-current arc-welding transformer is normally interrupted by switch means which connects the welding circuit to a reduced voltage tap on the transformer. A control relay operates to connect the switch means to the alternating-current source through a rectifier bridge circuit when the welding electrode is brought into contact with the work upon which a welding operation is to be performed. An additional control relay, responsive to the flow of welding current of a predetermined value in the welding circuit, maintains the switch means energized during a welding operation. When the welding circuit is interrupted, the switch means is mantained in the operated position for a predetermined time after deenergization since the rectifier bridge circuit provides a relatively low impedance shunt path for the operating winding of the switch means, which permits the continued flow of current through the operating winding for a predetermined time after deenergization of the rectifier bridge circuit.

Figure 2:
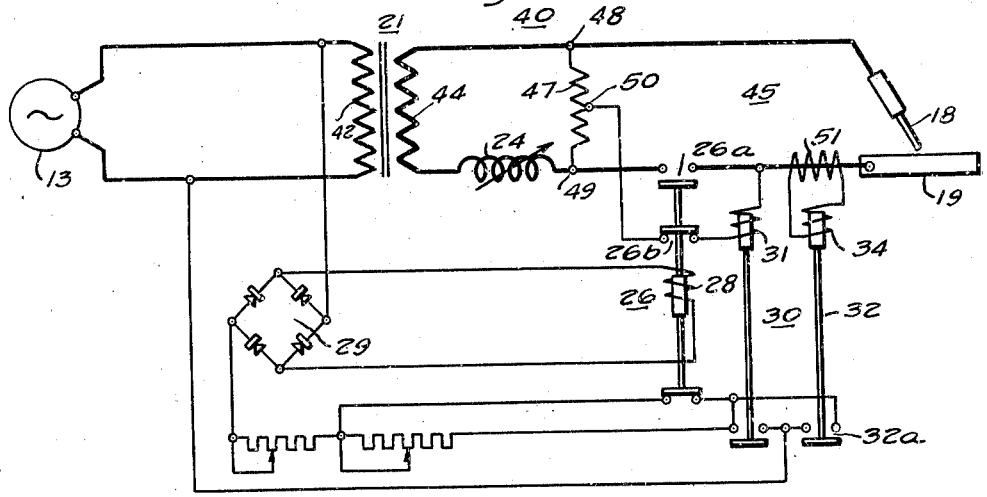

For a more complete understanding of the nature and scope of my invention, reference may be made to the following detailed description, which may be read in connection with the accompanying drawing, in which:

Figure 1 is a diagrammatic view of an alternating-current arc-welding system embodying the invention in one of its forms; and Fig. 2 is a diagrammatic view of an arc-welding system embodying the invention in a different form.

Referring to Fig. 1, the reference numeral 10 may denote, generally, an arc-welding system wherein an arc-welding transformer 11 is provided with a primary winding 12 which may be connected to a source of alternating current, such as the generator 13, and a secondary winding 15 which may be connected to an arc-welding circuit 17 which includes an arc-welding electrode 18 and work 19 upon which a welding operation is to be performed. The primary winding may be provided with an intermediate tap 20, while the secondary winding may be provided with a reduced voltage tap 22. Means such as the adjustable reactor 24 may be connected in series circuit relation with the secondary winding 15 to provide for adjusting the value of the current to be supplied to the arc welding circuit.

In order to provide for reducing the hazard occasioned by the maintenance of the full secondary voltage between the electrode 18 and work 19, switch means 26 may be provided having contact members 26a for normally interrupting the connection of the arc-welding circuit to the terminal 27 of the welding transformer, and contact members 26b for normally connecting the arc-welding circuit 17 to the reduced voltage tap 22.

In order to provide time delay characteristics for the switch means 26 in a simple and effective manner, the switch means may be provided with a short circuiting sleeve in accordance with the teachings of the Schaelchlin et al. Patent No.

1,979,709, and the operating winding 28 thereof may be connected to a source of alternating current through a rectifier bridge circuit 29 which may be energized from the source 13 by being, for example, connected across a portion of the primary winding 12 between the intermediate tap 20 and one of the main terminals thereof. The operating winding 28 may thus be energized by controlling the connection of the rectifier bridge circuit 29 to the source. Upon disconnection of the bridge circuit 29 from the source, the switch means 26 does not immediately return to the deenergized position since the short circuiting sleeve delays the decay of the magnetic flux produced by the operating winding and the bridge circuit 29 provides a relatively low impedance shunt circuit about the operating winding 28 for the discharge current from the operating winding, which also delays the decay of the flux. Accordingly, the switch means 26 is maintained in the operated position by the flow of this discharge current for a predetermined time after disconnection of the bridge circuit 29 from the source 13.

Control of the switch means 26 may be effected in any suitable manner, such as by means of a control relay 30 which may be provided with an operating winding 31 connected in series circuit relation with the reduced voltage tap 22 and the arc-welding circuit 17. Contact members 30a of the control relay may be used to connect the bridge circuit 29 to the alternating-current source 13 as soon as current flows to the arc-welding circuit from the reduced voltage tap.

In order to maintain the switch means 26 in the operated position during an arc-welding operation, an additional control relay 32 may be provided which may be responsive to the flow of current in the arc-welding circuit 17 from the main terminals of the secondary winding 15 of the arc-welding transformer 11. The control relay 32 may be provided with an operating winding 34 which may, for example, be connected in shunt circuit relation with the reactor 24. Contact members 32a of the control relay 32 parallel contact members 30a of the control relay 30 so as to provide a holding circuit for maintaining energization of the rectifier bridge circuit 29 so long as a predetermined welding current flows in the arc-welding circuit.

When the electrode 18 is disengaged from the work 19, a reduced voltage exists therebetween which is determined by the tapped portion of the secondary winding 15 between the reduced voltage tap 22 and the upper terminal 35 thereof and may be on the order of 35 volts instead of the full 60-90 volts of the secondary winding. When the electrode 18 engages the work 19, a circuit is provided from the reduced voltage tap through contact members 26b of the switch means 26 and the operating winding 31 of the control relay 30 so that the control relay picks up and connects the rectifier bridge circuit 29 to the source 13 through contact members 30a. The switch means 26 operates, closing contact members 26a so as to apply the full voltage of the secondary winding 15 to arc-welding circuit 17 for establishing and maintaining an arc between the electrode 18 and arc 19. The control relay 30 is deenergized upon the opening of contact members 26b. The switch means 26 cannot, however, immediately open since the bridge circuit 29 provides a relatively low impedance shunt for the operating winding 27. Accordingly, the deenergization of the control relay 30 has no instantaneous effect upon the operating position of the switch means 26. As soon as the switch means 26 operates, and welding current of a predetermined value closes the arc-welding circuit 17, the control relay 32 operates due to the voltage drop across the reactor 24 and provides a holding circuit through contact members 32a for connecting the bridge circuit 29 to the source 13.

Upon interruption of the welding circuit through removal of the electrode 18 from arcing engagement with the work 19, the control relay 32 is deenergized and the bridge circuit 29 is disconnected from the source 13. However, the switch means 26 is maintained in the operated position for a predetermined time on the order of from one to two seconds, for example, due to the flow of a discharge current from the operating winding 28 through the bridge circuit 29 when the bridge circuit is disconnected from the source. Accordingly, momentary interruptions of the arc-welding circuit do not disconnect the full secondary voltage therefrom, and momentary interruptions in the welding operation may be made for the inspection of the weld, for example, without requiring reengagement of the electrode and work to reconnect the full secondary voltage to the arc-welding circuit before the welding operation may be resumed.

Referring to Fig. 2, the reference numeral 40 may denote, generally, an arc-welding system wherein a welding transformer 41 may be provided with a primary winding 42 for connection to an alternating-current source such as the generator 13, and a secondary winding 44 for connection to an arc-welding circuit 45 which may include a welding electrode 18 and work 19 upon which a welding operation is to be performed. Means such as the variable reactor 24 may be connected in series circuit relation with the secondary winding 44 for controlling the value of the arc-welding current.

Since in many arc-welding transformers the reactor 24 may be contained within the housing of the welding transformer and, therefore, relatively inaccessible, or the reactance drop may be actually built into the welding transformer itself through well-known design features, it is often desirable to provide a reduced open circuit voltage safety control which may be self-contained and requires connections to the welding transformer only at the input and output terminals thereof. In order to achieve this result, means such as the autotransformer 47 may be provided for connection in shunt relation with the secondary winding 44 and reactor 24 across the output terminals 48 and 49 on the secondary side of the welding transformer 41. The autotransformer 47 may be provided with the reduced voltage tap 50 which may be connected to the arc-welding circuit 45 through contact members 26b of the switch means 26. Additional contact members 26a of the switch means may be used to normally disconnect the arc-welding circuit 45 from the secondary winding 44 of the welding transformer in a manner similar to that described in connection with the circuit shown in Fig. 1.

The switch means 26 may be energized from the source 13 through a rectifier bridge circuit 29 which provides time delay characteristics for the switch means through the medium of a control relay 30 having an operating winding 31 connected in series circuit relation with the reduced voltage tap 50 and the arc-welding circuit 45. An additional control relay 32 may be provided for maintaining the bridge circuit 29 energized during a welding operation through contact members 32a. Operation of the control relay 32 may be effected by connecting the operating winding 34 to a current transformer 51 connected in the arc-welding circuit. Operation of the control system shown in Fig. 2 is substantially similar to that described in detail in connection with Fig. 1 of the drawing since the control relay 30 connects the bridge circuit 29 to the source for effecting operation of the switch means 26 as soon as the electrode 18 engages the work 19. Operation of the switch means 26 connects the arc-welding circuit directly across the secondary winding 44 of the welding transformer and effects deenergization of the control relay 30. As soon as the welding current reaches a predetermined value, the control relay 32 operates to provide an energizing circuit for the rectifier bridge circuit 29.

Upon interruption of the arc between the electrode 18 and the work 19, the control relay 32 returns to the deenergized position and disconnects the rectifier bridge circuit 29 from a source 13. The switch means 26 remains in the operated position for a predetermined time after the disconnection of the bridge circuit from the source owing to the shunt circuit provided about the operating winding 28 by the bridge circuit.

From the above description and the accompanying drawing, it will be apparent that I have provided, in a simple and effective manner, for normally reducing the open circuit voltage of alternating-current arc-welding systems to a safe value. My invention requires a minimum of control apparatus since the time delay characteristic is incorporated into the switch means itself and does not require additional time delay relays and the like. Owing to the simplicity of the control circuit, reliable and efficient operation is obtained at a minimum of expense. Since my invention may be provided as an integral control unit, it may be readily applied to welding transformers of many different designs without affecting the proper operation of the control system.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. For use in controlling the energization of an arc-welding circuit including an electrode and work upon which a welding operation is to be performed, switch means normally connecting the welding circuit to a source of reduced voltage and operable to disconnect the welding circuit therefrom and connect it to a source of welding voltage, said means having an operating winding disposed to be connected to an alternating-current source through a rectifier bridge circuit to provide a time delay shunt for holding the switch means in the energized position for a predetermined time after deenergization, means responsive to the flow of current from the reduced voltage source operable to connect the bridge circuit to an alternating-current source for effecting operation of the switch means, and means responsive to the flow of current of a predetermined value in the welding circuit for maintaining the switch means energized during a welding operation.

2. For use in energizing an arc-welding circuit including an electrode and work upon which a welding operation is to be performed, an arc-welding transformer having a primary winding for connection to a source of alternating-current and a secondary winding, switch means having an operating winding energized from the source through a rectifier bridge circuit which provides a time delay shunt for delaying opening of the switch means, said switch means being operable to connect the arc-welding circuit to the secondary winding and arranged for normally connecting the welding circuit to a source of reduced voltage, means responsive to the contact of the electrode and the work operable to initiate energization of the operating winding, and means responsive to the flow of current of a predetermined value operable to provide an energizing circuit for maintaining the operating winding energized during a welding operation.

3. The combination with an alternating-current arc-welding transformer having a primary winding for connection to an alternating-current source and a secondary winding with a reduced voltage tap for connection to an arc-welding circuit including an electrode and work upon which a welding operation is to be performed, of an impedance connected in the welding circuit, switch means normally connecting the welding circuit to the reduced voltage tap and provided with an operating winding for operating the switch means to apply the normal secondary voltage to the welding circuit, circuit means for energizing the operating winding including a rectifier bridge circuit connected across the winding to provide a relatively low impedance shunt circuit for the winding and prevent opening of the switch means for a predetermined time after deenergization of the winding, relay means energizable to connect the bridge circuit to the alternating-current source in response to the flow of current from the reduced voltage tap, and additional relay means responsive to the flow of current from the full secondary winding for maintaining the connection of the bridge circuit during welding.

4. A reduced voltage control for an arc-welding transformer having a primary winding for connection to a source of alternating current and a secondary winding with a reduced voltage tap for connection to an arc-welding circuit including a reactance device, an electrode and work upon which an arc-welding operation is to be performed comprising, switch means normally connecting the welding circuit to the reduced voltage tap independently of the reactance device and having an operating winding energizable to operate the switch means to disconnect the welding circuit from the reduced voltage tap and connect it for applying the normal voltage of the secondary winding thereto through the reactance device, circuit means including a bridge circuit of rectifier devices connected in shunt relation with the operating winding to provide a time delay opening characteristic for the switch means upon disconnection of the bridge circuit from a source of energization, control means operable to connect the bridge circuit to a source of alternating current and having an operating winding normally connected in series circuit relation with the reduced voltage tap and the arc-welding circuit for operating the relay in response to engagement of the electrode with the work, and relay means having an operating winding connected in shunt relation with the reactance device for maintaining the connection of the rectifier bridge circuit to the source during an arc-welding operation.

5. A control system for an alternating-current arc-welding system including an arc-welding circuit comprising, means for producing a reduced control voltage, switch means normally operable to apply the reduced voltage to the arc-welding circuit and having an operating winding energizable to effect operation of the switch means to connect the welding circuit to a source of welding voltage, means including a shunt rectifier bridge circuit and relay means operable under the control of the switch means for effecting energization of the operating winding of the switch means and providing a time delay discharge circuit therefor, and control means responsive to a predetermined value of arc-welding current in the arc circuit for maintaining the switch means operating winding energized.

6. For use with arc-welding transformers having different operating characteristics for energizing arc circuits, an autotransformer having a reduced voltage tap, switch means normally operable to connect the arc circuit to the reduced voltage tap and having an operating winding energizable to operate the switch means to connect the welding circuit to a source of normal welding voltage, and control means including means responsive to the flow of current in the arc-welding circuit and a rectifier bridge circuit connected in shunt with the operating winding for operating the switch means and maintaining it in the operated position for a predetermined time after welding current ceases to flow.

7. In combination, an arc-welding transformer having a primary winding with a tap for connection to an alternating-current source and a secondary winding for connection to an arc-welding circuit including an electrode and work upon which a welding operation is to be performed, a reactance device connected between the secondary winding and the welding circuit, an autotransformer connected across the secondary winding between the reactance device and the arc-welding circuit and having a reduced voltage tap, switch means normally connecting the arc-welding circuit to the reduced voltage tap and having an operating winding energizable for operating the switch means to disconnect the arc-welding circuit from the reduced voltage tap and connect it across the normal secondary voltage of the arc-welding transformer, circuit means including a rectifier bridge circuit connected in shunt relation with the operating winding for connecting it to the alternating-current source for energization and providing a time delay discharge circuit therefor, and control means responsive to the flow of current in the arc-welding circuit for connecting the circuit means to the source.

ELROY I. EIGENBERGER.

REFERENCES CITED

The following references are of record in the file of this patent:

UNITED STATES PATENTS

| Number | Name | Date |
| --- | --- | --- |
| 1,251,764 | Florandin | Jan. 1, 1918 |
| 1,296,020 | Thornton | Mar. 4, 1919 |
| 1,354,398 | Holslag | Sept. 28, 1920 |
| 1,357,486 | Bennett | Nov. 2, 1920 |
| 1,864,610 | Parker | June 28, 1932 |
| 2,078,690 | Schueler | Apr. 27, 1937 |
| 2,110,436 | Candy | Mar. 8, 1938 |
| 2,189,606 | King | Feb. 6, 1940 |
| 2,363,332 | Jennings | Nov. 21, 1944 |